United States Patent
Smith et al.

(10) Patent No.: US 9,679,735 B2
(45) Date of Patent: Jun. 13, 2017

(54) TRAVEL LOCKOUT MONITORING SYSTEM

(71) Applicant: ASA Electronics, LLC, Elkhart, IN (US)

(72) Inventors: Vince Smith, Bristol, IN (US); Gerald J. Maffetone, Edwardsburg, MI (US)

(73) Assignee: ASA Electronics, LLC, Elkhart, IN (US)

( * ) Notice: Subject to any disclaimer, the term of this patent is extended or adjusted under 35 U.S.C. 154(b) by 0 days.

(21) Appl. No.: 15/062,928

(22) Filed: Mar. 7, 2016

(65) Prior Publication Data

US 2016/0291601 A1    Oct. 6, 2016

Related U.S. Application Data

(60) Provisional application No. 62/129,130, filed on Mar. 6, 2015.

(51) Int. Cl.
*H01H 89/00*    (2006.01)
*B60P 3/34*    (2006.01)
*B60R 16/023*    (2006.01)
*E04H 15/08*    (2006.01)

(52) U.S. Cl.
CPC .............. *H01H 89/00* (2013.01); *B60P 3/34* (2013.01); *B60R 16/0231* (2013.01); *E04H 15/08* (2013.01)

(58) Field of Classification Search
CPC combination set(s) only.
See application file for complete search history.

(56) References Cited

U.S. PATENT DOCUMENTS

| | | | |
|---|---|---|---|
| 4,494,765 A | 1/1985 | Ratsko et al. | |
| 4,500,132 A | 2/1985 | Yoder | |
| 5,067,743 A | 11/1991 | Kokubo et al. | |
| 5,157,313 A * | 10/1992 | Zagroun | B60Q 1/05 318/266 |
| 5,237,782 A | 8/1993 | Cooper | |
| 5,312,119 A | 5/1994 | Schneider et al. | |
| 5,485,900 A | 1/1996 | Denny | |
| 6,067,756 A | 5/2000 | Frerichs et al. | |
| 6,345,854 B1 | 2/2002 | McManus | |
| 6,575,514 B2 | 6/2003 | McManus et al. | |
| 6,623,058 B1 * | 9/2003 | Crean | B60P 3/34 296/165 |
| 6,782,936 B1 | 8/2004 | Girard et al. | |
| 6,894,447 B1 | 5/2005 | Friede et al. | |
| 6,948,754 B2 * | 9/2005 | Huffman | B60P 3/34 296/176 |

(Continued)

*Primary Examiner* — Thomas G Black
*Assistant Examiner* — Ana Thomas
(74) *Attorney, Agent, or Firm* — Taylor IP, P.C.

(57) ABSTRACT

A vehicle system including a housing, an extendable/retractable member coupled to the housing, an electrically controlled actuator and a lockout system. The electrically controlled actuator is connected to the extendable/retractable member, and is configured to extend and retract the extendable/retractable member relative to the housing. The lockout system includes a detection sensor and a controller. The detection sensor generates a signal upon a detection of a motion of the vehicle system or an anticipated movement of the vehicle system. The controller is in commanding communication with the electrically controlled actuator, and the controller locks the electrically controlled actuator from functioning upon receipt of the signal.

20 Claims, 3 Drawing Sheets

(56) References Cited

U.S. PATENT DOCUMENTS

| | | |
|---|---|---|
| 7,242,162 B2 | 7/2007 | Goth |
| 8,141,927 B2 | 3/2012 | Kreil |
| 8,388,040 B2 | 3/2013 | Bone |
| 8,474,788 B2 | 7/2013 | Phillips et al. |
| 8,752,881 B2 | 6/2014 | Chenowth |
| 8,887,785 B2 | 11/2014 | Goth |
| 9,139,123 B2 | 9/2015 | Cepynsky |
| 2005/0184546 A1 | 8/2005 | Kunz et al. |
| 2006/0113822 A1 | 6/2006 | Kunz |
| 2006/0125266 A1 | 6/2006 | Kunz |
| 2006/0178795 A1* | 8/2006 | Queveau ................ B60J 7/0573 701/49 |
| 2008/0252025 A1 | 10/2008 | Plath |
| 2011/0037584 A1 | 2/2011 | Kenny et al. |
| 2015/0057885 A1 | 2/2015 | Brady et al. |

\* cited by examiner

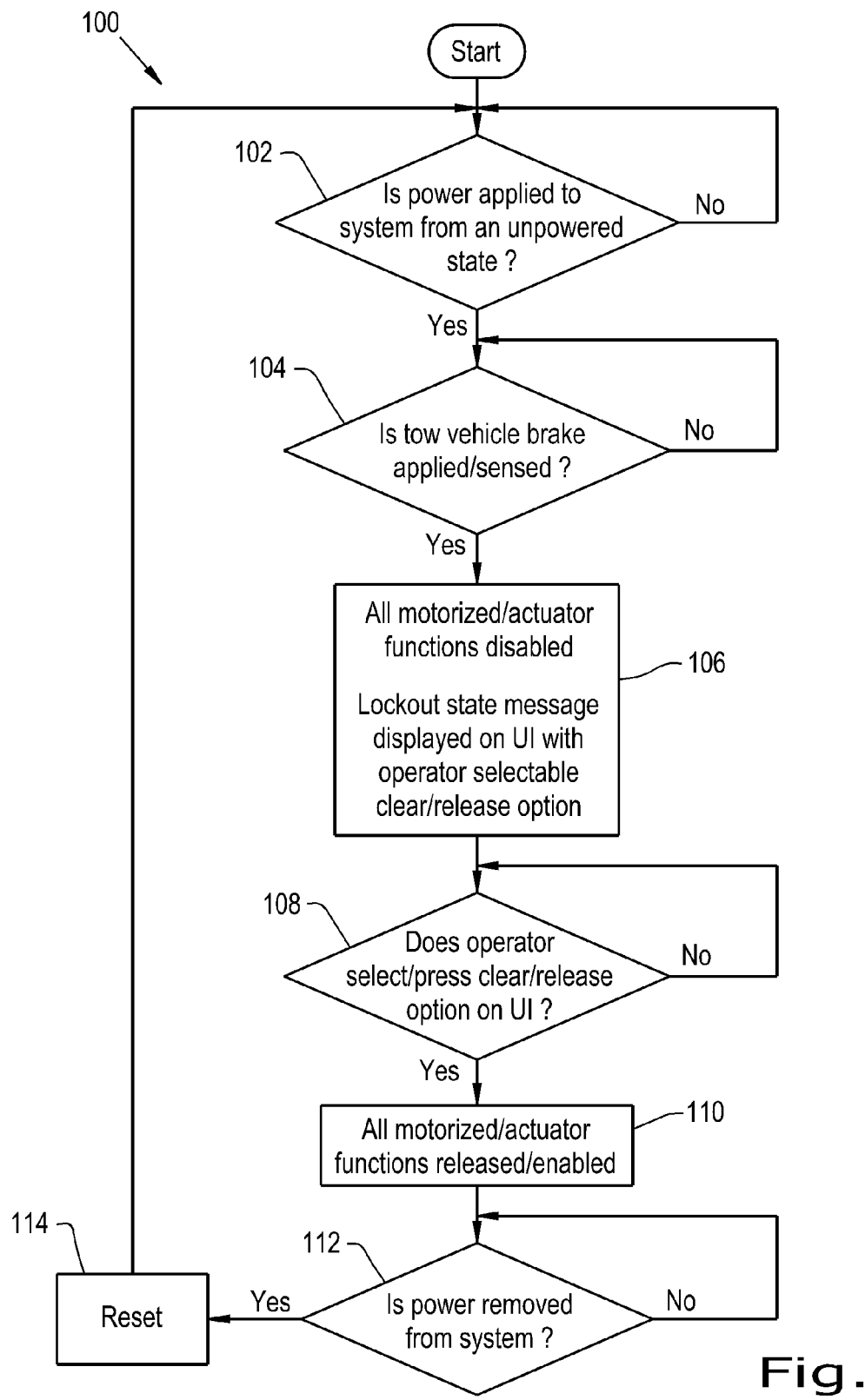

TRAVEL LOCKOUT MONITORING SYSTEM

CROSS REFERENCE TO RELATED APPLICATIONS

This is a non-provisional patent application based on U.S. Provisional Application Ser. No. 62/129,130, entitled "RECREATIONAL VEHICLE", filed Mar. 6, 2015 which is incorporated herein by reference.

BACKGROUND OF THE INVENTION

1. Field of the Invention

The present invention relates to recreational vehicles having extendable/retractable elements such as awnings or room slide-outs.

2. Description of the Related Art

In the vehicle industry, it is known to have electronic devices that are connected with devices built into the vehicle. A large segment of the American population owns motor homes, travel trailers, or fifth wheel trailers, broadly referred to herein as recreational vehicles (RVs).

RVs typically include a housing unit mounted on top of a chassis. Also mounted to the chassis is one or more axles with wheels attached thereon so as to allow travel of the RV. The RV can be either pulled by a towing vehicle, or be self-propelled.

Many RVs have an awning that can be deployed when at rest so as to provide a cover from sun and rain. A typical awning is positioned along the side of the RV such that when deployed, it provides a cover from the sun and rain so as to enhance the RV experience.

RVs are known to have rooms that may be extended and retracted. U.S. Pat. No. 6,067,756 issued to Frerichs et al. shows one such room extender. An extended slide-out provides more internal living space for the comfort and convenience of occupants. When the slide-out is retracted the RV then conforms to a street legal width specification and also increases the rigidity and aerodynamic performance of the mobile RV.

The RV may have several rooms which can be expanded with a slide-out system. Each slide-out generally involves a single, integrated structure which can be moved with respect to the vehicle chassis. The movable structure includes a floor, a ceiling, side walls, and an exterior wall which are connected together. The structure is sized and dimensioned so that it can pass through an opening in an exterior wall of the RV, and is motor driven so that it may move outward into the extended position, and inward into a retracted position. U.S. Publication Nos. 2005/0184546, 2006/0125266, and 2006/0113822 all disclose slide-out drive systems that may be used with extendable bay windows within slide-out rooms.

C. T. Yoder, in U.S. Pat. No. 4,500,132, discloses a travel trailer with a slide-out room having a floor, side walls, end wall, and a roof. Movement of the slide-out room between its extended and retracted or travel positions is achieved with an electric motor connected through a gear box to telescopic extension members. The outside wall of the slide-out room is connected to the extension members. The connection includes vertically-adjustable bolt and nut assemblies to vertically position the slide-out room relative to the trailer side wall. D. R. Cooper, in U.S. Pat. No. 5,237,782, discloses a travel trailer with a slide-out room mounted on movable rails. The room and rails are laterally moved with a worm gear driven by an electric motor. The outside wall of the slide-out room has an outwardly-directed peripheral extension supporting a liquid-sealing assembly. The sealing assembly engages an adjacent portion of the trailer side wall to prevent water, snow, and air from flowing into the interior of the trailer when the slide-out room is in the retracted position.

What is needed in the art is a system and method that will act to protect the vulnerable extendable elements when the RV is being readied for transport.

SUMMARY OF THE INVENTION

The present invention provides an RV extendable member lockout when movement of the RV may be imminent.

The invention in one form is directed to a vehicle system including a housing, an extendable/retractable member coupled to the housing, an electrically controlled actuator and a lockout system. The electrically controlled actuator is connected to the extendable/retractable member, and is configured to extend and retract the extendable/retractable member relative to the housing. The lockout system includes a detection sensor and a controller. The detection sensor generates a signal upon a detection of a motion of the vehicle system or an anticipated movement of the vehicle system. The controller is in commanding communication with the electrically controlled actuator, and the controller locks the electrically controlled actuator from functioning upon receipt of the signal.

The invention in another form is directed to a lockout method to operate a lockout system of a vehicle system having an extendable/retractable member coupled to a housing, the method includes the steps of detecting at least one of a motion of the vehicle system or an anticipated movement of the vehicle system and generating a signal indicating the detection; and locking at least one electrically controlled actuator coupled to the extendable/retractable member from functioning upon receiving the signal.

An advantage of the present invention is that the motion of vulnerable elements of the RV are prevented from moving, particularly extending, when activity of the towing vehicle is detected.

Another advantage of the present invention is that the user is alerted and appropriate action can be taken.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a flowchart depicting an embodiment of a lockout method that is used with the lockout system of FIG. 2.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
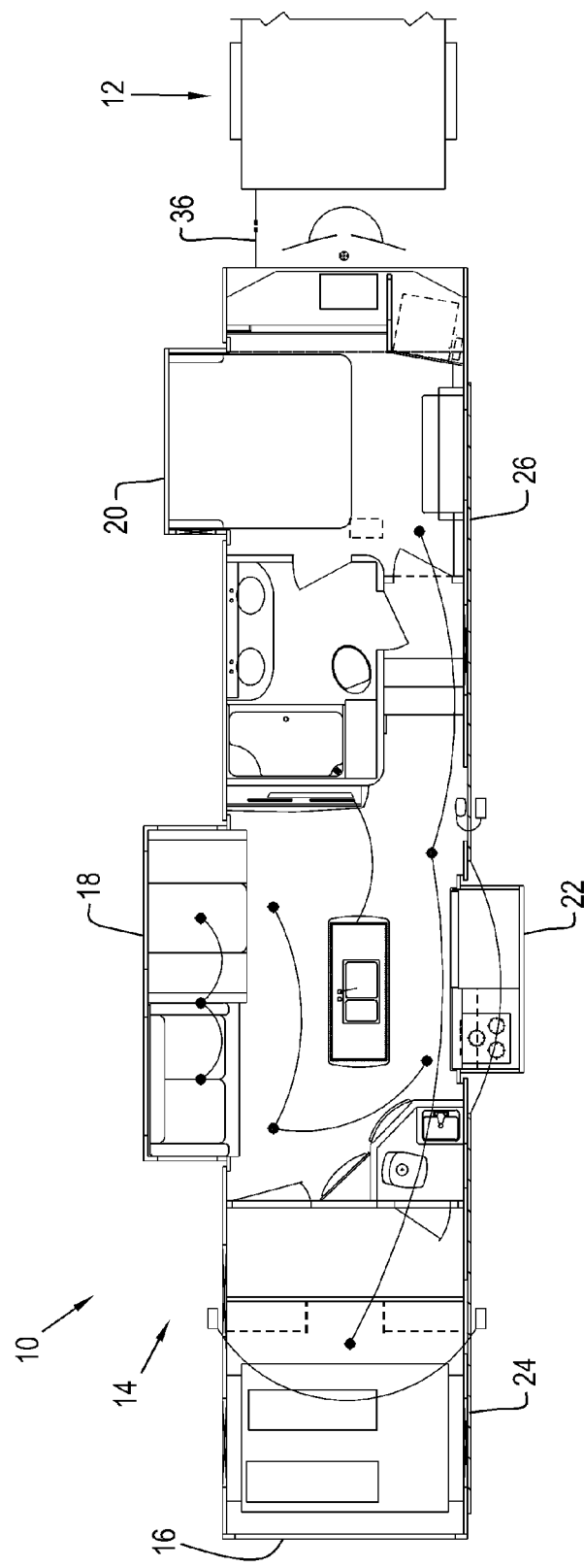
FIG. 1 is a schematical top view of a vehicle system that has an embodiment of a lockout system of the present invention.

Referring now to the drawings, and more particularly to FIG. 1, there is shown a vehicle system 10 having a towing portion 12 and a recreational vehicle (RV) portion 14. Towing portion 12 may be a truck 12 or semi-truck tractor 12; however, for some embodiments of the inventions the functions of portions 12 and 14 may be combined as a self-contained RV 10. For some embodiments of the present invention it is assumed that RV portion 14 is detachably connected to truck 12.

RV portion 14 includes a housing 16, extendable room portions 18, 20 and 22, and awnings 24 and 26. Portions 18, 20 and 22, as well as awnings 24 and 26 can be referred to as extendable members 18-26, which are extendable and retractable.

Figure 2:
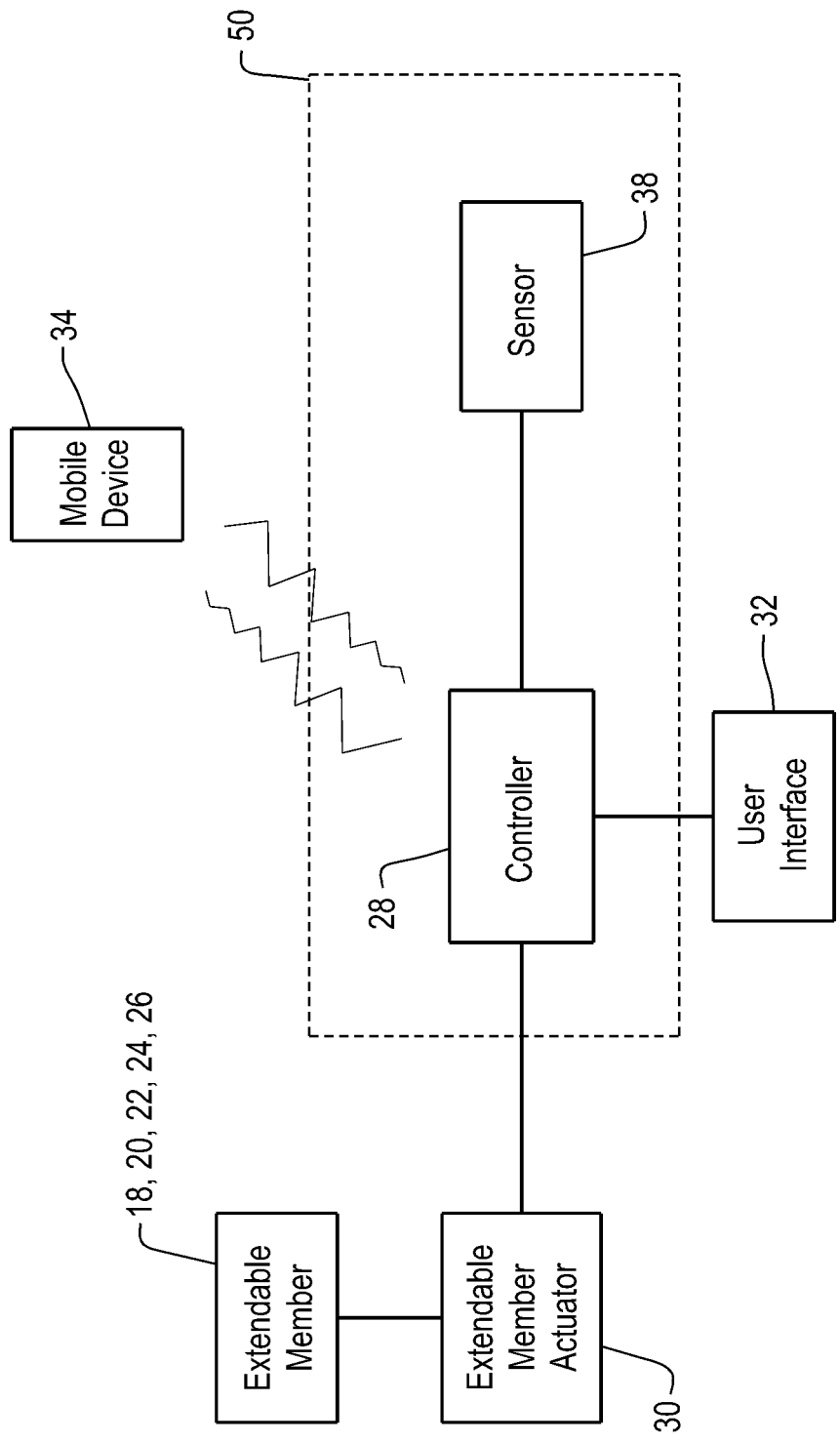
FIG. 2 is a schematical block diagram of elements the lockout system used with the vehicle system of in FIG. 1.

Now, additionally referring to FIGS. 2 and 3 there is illustrated in a block diagram form a controller 28, actuators 30, a user interface 32, a mobile device 34 and a sensor 38. Separate actuators 30 of various forms, known in the art, are coupled to extendable/retractable members 18-26, with each actuator being under the command of controller 28, at least for the purpose of illustrating the present invention.

A travel lockout monitoring system 50 carries out a lockout method 100. Controller 28 receives a signal generated by sensor 38, which may be referred to as a detector 38. Sensor 38 can detect a voltage variation, an electrical current change or a movement of RV 14, that indicate motion of RV 14 and thereby lockout the movement, particularly the extension of any extendable member 18-26. In one embodiment of the present invention this is carried out when the activation of vehicle 12 is detected by way of an electrical coupling 36 between vehicle 12 and RV 14. For example, electrical coupling 36 may carry standard electrical wiring for the activation of turn signals, brake lights and marker lights on RV 14, and the detection of activity on one or some combination of these will cause controller 28 to disable the electrically controlled actuator 30, to prevent the movement of any extendable member 18-26. This can be considered as a preemptive lockout in anticipation of movement of RV 14. Further a warning may be issued if any extendable member is not fully retracted when motion is detected. It is also contemplated that the movement of RV 14 can be detected in other ways, such as with the use of accelerometers or other position or movement detection devices. It is further contemplated that electrical brakes of the wheels of RV 14 may be engaged to hinder the movement of RV 14 if an extendable member 18-26 is not fully retracted.

Lockout method 100 includes various steps as depicted in FIG. 3. At step 102, the question is asked whether power has been applied, here for purposes of illustration, power being applied refers to whether coupling 36 is connected to truck 12 and power is detected thereon. If this is not true then the method waits at step 102. If power is applied then at step 104 sensor 38 is will provide a signal to controller 28 if the brake is applied in truck 12, for example, by the detection of a brake light signal or an electrical brake applying signal.

When the signal is generated controller 28 disables or locks out the functioning of all actuators 30 at step 106. Now method 100 waits for a clearing signal to override the lockout condition at step 108. Such a signal is sent by user interface (UI) 32 or by way of an app on mobile device 34, to thereby direct controller 28 to release the lockout, at step 110, and enable actuators 30 to now be able to move under the command of selector switches, or other methods not shown.

If power is removed at step 112, again as detected by way of sensor 38 that is monitoring the electrical lines of coupling 36, then system 50 may be reset at step 114. Alternatively, method 100 may proceed from step 110 back to step 102.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle system, comprising:
a housing;
an extendable/retractable member coupled to the housing;
an electrically controlled actuator connected to the extendable/retractable member, the electrically controlled actuator being configured to extend and retract the extendable/retractable member relative to the housing;
a lockout system including:
a detection sensor that generates a signal upon a detection of a motion of the vehicle system or an anticipated movement of the vehicle system; and
a controller in commanding communication with the electrically controlled actuator, the controller locking the electrically controlled actuator from functioning upon receiving the signal.

2. The vehicle system of claim 1, wherein the detection sensor detects the application of a brake and generates the signal as a result of the detection of the application of the brake.

3. The vehicle system of claim 2, wherein the brake is in a tow vehicle.

4. The vehicle system of claim 3, wherein the detection sensor detects a voltage on a brake light signal line when the brake is applied.

5. The vehicle system of claim 4, further comprising a user interface in communication with the controller, the controller sending a message to the user interface indicating that the electrically controlled actuator is locked.

6. The vehicle system of claim 5, wherein the controller further unlocks the electrically controlled actuator upon receiving a command to unlock from the user interface.

7. The vehicle system of claim 6, wherein the controller further detects a disconnection of the tow vehicle and resets the lockout system upon the detection of the disconnection.

8. The vehicle system of claim 1, further comprising a user interface in communication with the controller, the controller sending a message to the user interface indicating that the electrically controlled actuator is locked.

9. The vehicle system of claim 8, wherein the controller further unlocks the electrically controlled actuator upon receiving a command to unlock from the user interface.

10. The vehicle system of claim 9, wherein the controller further detects a disconnection of a tow vehicle and resets the lockout system upon the detection of the disconnection.

11. A lockout method to operate a lockout system of a vehicle system having an extendable/retractable member coupled to a housing, the method comprising the steps of:
detecting at least one of a motion of the vehicle system or an anticipated movement of the vehicle system and generating a signal indicating the detection; and locking at least one electrically controlled actuator coupled to the extendable/retractable member from functioning upon receiving the signal.

12. The method of claim 11, wherein the detecting step detects an application of a brake and generates the signal as a result of the detection of the application of the brake.

13. The method of claim 12, wherein the brake is in a tow vehicle.

14. The method of claim 13, wherein the detecting step detects a voltage on a brake light signal line when the brake is applied.

15. The method of claim 14, wherein a controller carries out the steps of the method, the controller being in communication with a user interface, the controller sending a message to the user interface indicating that the electrically controlled actuator is locked.

16. The method of claim 15, further comprising the step of unlocking the electrically controlled actuator upon receiving a command to unlock from the user interface.

17. The method of claim 16, further comprising the steps of:
detecting a disconnection of the tow vehicle; and
resetting the lockout system upon the detection of the disconnection.

18. The method of claim 11, further comprising the step of sending a message to a user interface indicating that the electrically controlled actuator is locked.

19. The method of claim 18, further comprising the step of unlocking the electrically controlled actuator upon receiving a command to unlock from the user interface.

20. The method of claim 19, further comprising the step of detecting a disconnection of a tow vehicle and resetting the lockout system upon the detection of the disconnection.

* * * * *